US008737731B2

(12) United States Patent
Park et al.

(10) Patent No.: US 8,737,731 B2
(45) Date of Patent: May 27, 2014

(54) METHOD AND APPARATUS FOR CORRECTING LIGHT

(75) Inventors: Seong Hee Park, Daejeon (KR); Insu Kim, Seoul (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 177 days.

(21) Appl. No.: 13/327,005

(22) Filed: Dec. 15, 2011

(65) Prior Publication Data

US 2012/0153837 A1 Jun. 21, 2012

(30) Foreign Application Priority Data

Dec. 16, 2010 (KR) ........................ 10-2010-0129405
Jun. 2, 2011 (KR) ........................ 10-2011-0053471

(51) Int. Cl.
*G06K 9/00* (2006.01)
*H01R 33/00* (2006.01)

(52) U.S. Cl.
USPC ........................................... 382/167; 362/642

(58) Field of Classification Search
USPC ................. 382/162, 167, 276, 305, 312, 274; 315/151, 247; 345/30, 80, 82, 84, 88; 362/84, 97.1, 97.2, 97.3, 642
See application file for complete search history.

(56) References Cited

U.S. PATENT DOCUMENTS 7,358,929 B2 * 4/2008 Mueller et al. ................. 345/1.3
7,524,097 B2 * 4/2009 Turnbull et al. .............. 362/545
8,188,878 B2 * 5/2012 Pederson et al. ......... 340/815.45
8,368,315 B2 * 2/2013 Gaines et al. ................. 315/247
8,449,130 B2 * 5/2013 Roberts et al. .................. 362/85
8,476,844 B2 * 7/2013 Hancock et al. .............. 315/307

FOREIGN PATENT DOCUMENTS

KR 10-2007-0014813 2/2007
KR 10-2009-0014903 2/2009
KR 10-2009-0073601 7/2009

* cited by examiner

*Primary Examiner* — Kanjibhai Patel
(74) *Attorney, Agent, or Firm* — Staas & Halsey LLP

(57) ABSTRACT

Light emitted from a lighting device including a white LED and RGB LEDs is sensed when the lighting device is driven based on a predetermined reference value, sensed data is converted into values corresponding to color coordinates, and a difference between the value and a reference value is calculated. It is determined whether or not the lighting device is corrected on the basis of the calculated difference, and the lighting device is selectively corrected depending on the determination result.

15 Claims, 7 Drawing Sheets

METHOD AND APPARATUS FOR CORRECTING LIGHT

CROSS-REFERENCE TO RELATED APPLICATION

This application claims priority to and the benefit of Korean Patent Application No. 10-2010-0129405 and 10-2011-0053471 filed in the Korean Intellectual Property Office on Dec. 16, 2010 and Jun. 2, 2011, the entire contents of which are incorporated herein by reference.

BACKGROUND OF THE INVENTION (a) Field of the Invention

The present invention relates to a method for correcting light. More particularly, the present invention relates to a method and apparatus for correcting a color or color temperature of light.

(b) Description of the Related Art

A variety of lighting means are used as lighting devices. One of them is a light emitting diode (LED) that is a semiconductor emitting light. LEDs are connected in series and parallel to form an LED light. There are various methods for forming white light. A first method forms white light using the same white LEDs having a desired color temperature and color rendering index (CRI). A second method forms white light using white LEDs respectively having different color temperatures and CRIs and obtains white light having a desired color temperature and CRI by adjusting the luminance of each of the LEDs. A third method mixes white, blue, and red LEDs in an appropriate manner to constitute white light and then produces white light having a desired color temperature and CRI by adjusting the luminance of each LED. A fourth method constitutes white light using only RGB LEDs. In this case, it is possible to produce white light by mixing a white LED with the RGB LEDs. The fourth method for forming a white light can produce full color light, which can make sensitive light by generating light depending on human sensitivity.

LEDs have properties depending on their characteristics, and thus an LED light composed of LEDs may have illuminance uniformity depending on the characteristics of the LEDs. Since LED characteristics vary with surrounding environments such as temperature, humidity, etc., characteristics of an LED light composed of LEDs may also be changed according to a surrounding environment variation, and an initially set color temperature and CRI of the LED light may be varied with time.

Accordingly, a technology for correcting a color temperature of an LED light by measuring a surrounding temperature and controlling luminances of white LEDs or non-white LEDs having different color temperatures for a color temperature variation of the LED light due to a variation in the surrounding temperature has been provided. However, the conventional technology is limited to white light.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a light correcting method and apparatus having advantages of minimizing a variation in an LED light depending on a surrounding environment and time. Also, the present invention has been made in an effort to provide a light correcting method and apparatus having advantages of providing uniform light all the time.

According to one aspect of the present invention, a method for correcting a lighting device includes: sensing light emitted from the lighting device when the lighting device is driven and generating sensing data including RGB values corresponding to the sensed light; converting the sensing data into measured color coordinate values corresponding to color coordinates; calculating differences between the measured color coordinate values corresponding to the sensing data and reference color coordinate values used when the lighting device is driven; and correcting the reference color coordinate values on the basis of the calculated differences.

According to another aspect of the present invention, an apparatus for correcting a lighting device includes: a sensing unit that senses light emitted from the lighting device when the lighting device is driven and generating sensing data including RGB values corresponding to the sensed light; and a correction unit that corrects reference color coordinate values corresponding to color coordinates used when the lighting device is driven using the sensing data, wherein the correction unit includes: a conversion module that converts the sensing data into measured color coordinate values corresponding to color coordinates; a calculation module that calculates differences between the measured color coordinate values corresponding to the sensing data and the reference color coordinate values used when the lighting device is driven; and a correction module that corrects the reference color coordinate values on the basis of the calculated differences.

The color coordinate values may be composed of x, y, and z, and the differences may include a first difference corresponding to a difference between an x value of the measured color coordinate values corresponding to the sensing data and an x value of the reference color coordinate values, a second difference corresponding to a difference between a y value of the measured color coordinate values corresponding to the sensing data and a y value of the reference color coordinate values, and a third difference corresponding to a difference between a z value of the measured color coordinate values corresponding to the sensing data and a z value of the reference color coordinate values.

DETAILED DESCRIPTION OF THE EMBODIMENTS

Figure 1:
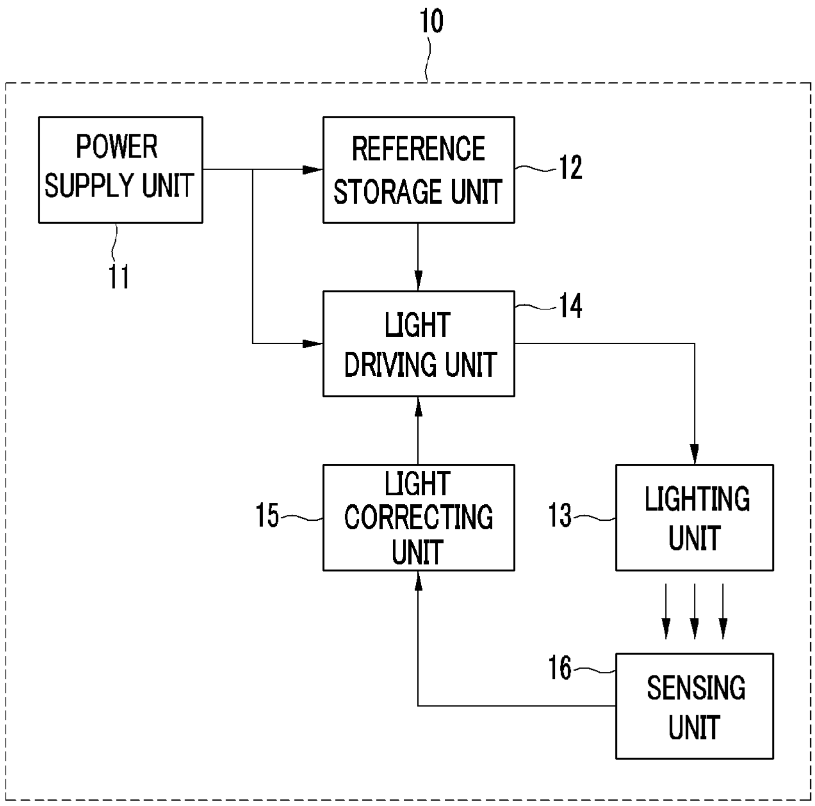
FIG. 1 shows a configuration of a lighting device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the whole specification, unless explicitly described to the contrary, the word "comprise" and variations such as "comprises" or "comprising" will be understood to imply the inclusion of stated elements but not the exclusion of any other elements.

A method and apparatus for correcting light according to an exemplary embodiment of the present invention will be explained with reference to the attached drawings.

FIG. 1 shows a configuration of a lighting device according to an exemplary embodiment of the present invention.

As shown in FIG. 1, a light device 10 according to an exemplary embodiment of the present invention includes a power supply unit 11, a reference value storage unit 12, a lighting unit 13, a light driving unit 14, a correction unit 15, and a sensing unit 16.

The power supply unit 11 transforms an input AC power into a DC voltage for driving the light device. Here, the power supply unit 11 converts the input AC power into a voltage level required to driving a LED.

The reference value storage unit 12 stores a plurality of reference values corresponding to a required color temperature and color of light, for example, x, y, and z reference values. The reference values are color coordinates representing chromaticity points on a chromaticity diagram, that is, x, y, and z coordinate values which correspond to the color temperature and color. Chromaticity points on the chromaticity diagram can be designated depending on a required color temperature and color, and xyz coordinate values corresponding to the designated chromaticity points are set and stored in the reference value storage unit 12.

The light driving unit 14 drives the lighting unit 13 based on the voltage supplied from the power supply unit 11. Specifically, the light driving unit 14 drives the lighting unit 13 on the basis of the reference values stored in the reference value storage unit 12.

The sensing unit 16 senses light emitted from the driven lighting unit 13 and outputs sensing data corresponding to the emitted light. The sensing data includes red, green, and blue (RGB) data of the sensed light. To implement this, the sensing unit 16 may be configured with an RGB color sensor. The RGB data is RGB values including an R value, a G value, and a B value that respectively correspond to an R component, a G component, and a B component of the light emitted from the lighting unit 13.

The light correction unit 15 corrects LED light such that the LED light does not deviate from reference values on the basis of differences between the sensing data provided by the sensing unit 16 and reference values used when the lighting unit 13 is driven.

The lighting unit 13 includes a plurality of LEDs having different color temperatures and CRIs. The plurality of LEDs include a white LED and RGB LEDs and emit light corresponding to a user's request. Here, the RGB LEDs represent an R LED, a G LED, and a B LED. While the lighting unit 13 includes the white LED and RGB LEDs in this embodiment, the present invention is not limited thereto.

Figure 2:
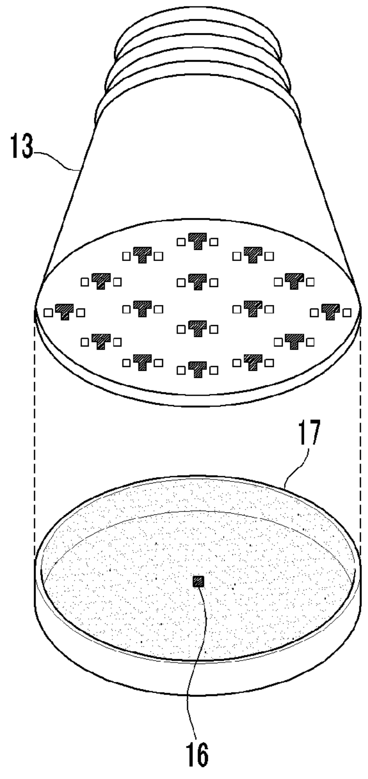
FIG. 2 illustrates a relationship between locations of a lighting unit and a light sensing unit according to an exemplary embodiment of the present invention.

FIG. 2 illustrates a relationship between locations of the lighting unit and the light sensing unit according to an exemplary embodiment of the present invention.

As shown in FIG. 2, the lighting unit 13 according to an exemplary embodiment of the present invention includes the white LED and RGB LEDs. The white LED may include a warm white/cool white LED. The RGB LEDs and white LED form one lighting LED, and the lighting unit 13 may include a plurality of lighting LEDs.

The light sensing unit 16 for sensing a light emitted from the lighting unit 13 needs to be located in a place where the light sensing unit 16 can sufficiently receive the light from the lighting unit 13. The light sensing unit 16 may be located on a diffuser 17 such that the light sensing unit 16 corresponds to a direction in which the lighting unit 13 emits light since more accurate light correction is achieved when surrounding light barely affects the light correction. In this case, the light emitted from the lighting unit 13 is sensed by the light sensing unit 16, and the light sensing unit 16 can measure the light from the lighting unit 13 more accurately while being less affected by the surrounding light according to the diffuser 17. The diffuser 17 may include a power line and a signal line.

The LED lighting device 10 having the above configuration according to an exemplary embodiment of the present invention emits light having a desired color temperature and color, and the state of the emitted light is measured and corrected at predetermined intervals.

To achieve this, the light correction unit 15 corresponding to a correcting device according to an exemplary embodiment of the present invention has the following configuration.

Figure 3:
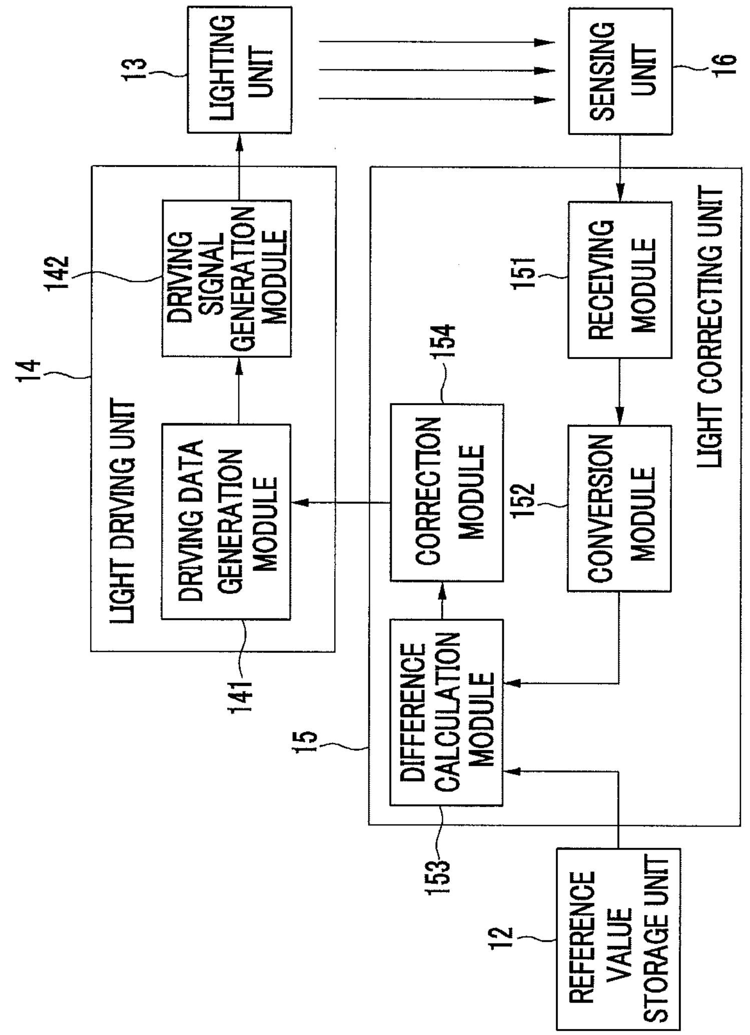
FIG. 3 shows configurations of a light correction unit and a light driving unit according to an exemplary embodiment of the present invention.

FIG. 3 shows structures of the light correction unit 15 and the light driving unit 14 according to an exemplary embodiment of the present invention.

As shown in FIG. 2, the light correction unit 15 according to an exemplary embodiment of the present invention includes a receiving module 151, a conversion module 152, a difference calculation module 153, and a correction module 154.

The receiving module 151 receives the sensing data (RGB data) transmitted from the light sensing unit 16, and the conversion module 152 converts the received sensing data into a reference value form.

In an exemplary embodiment of the present invention, the sensing data includes RGB data that represents R, G, and B values measured by an RGB sensor of the sensing unit 16. The RGB sensor of the sensing unit 16 measures three colors, that is, red (R), green (G), and blue (B), from input light and outputs measured values. The R, G, and B values of the input light are referred to as RGB data. Chromaticity points corresponding to a color temperature and color of the received light may be found from a chromaticity diagram on the basis of the measured RGB data, and the RGB data of the received light may be converted into xyz values in the form of reference values corresponding to the chromaticity point found. The xyz values corresponding to the RGB data may be referred to as measured color coordinate values.

The conversion module 152 converts the sensing data into the xyz values in the form of a reference value, and the difference calculation module 153 calculates differences between reference values used when the lighting unit 13 is driven and the xyz values provided by the conversion module 152.

The correction module 154 corrects data for driving the lighting unit 13 on the basis of the calculated differences. Specifically, the correction module 154 generates correction data based on the calculated differences and transmits the correction data to the light driving unit 14. The correction data represents values obtained by applying the differences of the xyz values corresponding to the measured RGB data to the reference values.

In addition, the correction module 154 according to an exemplary embodiment of the present invention performs error checking based on the differences in order to prevent wrong light correction due to strong external stimulation (a light from another lighting device, sunlight, defective LEDs, etc.), which will be described in detail later.

The light driving unit 14 drives the lighting unit 13 on the basis of the reference values stored in the reference value storage unit 12 or the correction data provided by the light correction unit 15. To achieve this, the light driving unit 14 includes a driving data generation module 141 and a driving signal generation module 142.

The driving data generation module 141 converts the reference values or the correction data into driving data for substantially driving the lighting unit 13. The lighting unit 13 includes a plurality of LEDs corresponding to RGB LEDs. The driving data is RGB values converted from xyz values corresponding to the reference values or correction data and is used to drive the RGB LEDs of the lighting unit 13.

The driving signal generation module 142 generates a driving signal in the form of a pulse width modulation (PWM) signal based on the driving data and outputs the driving signal to the lighting unit 13. Specifically, the driving signal generation module 142 generates a driving signal for driving the RGB LEDs of the lighting unit 13 based on the RGB values of the driving data, and generates and outputs an R driving signal corresponding to the R value for driving the R LED, a G driving signal corresponding to the G value for driving the G LED, and a B driving signal corresponding to the B value for driving the B LED. If the lighting unit 13 includes a white LED, the driving signal generation unit 142 generates a white driving signal for white light based on the RGB values of the driving data and outputs the white driving signal to the white LED.

The light correction unit 15 having the above configuration automatically corrects the state of the light emitted from the lighting unit 13 to perform a fundamental function for producing optimal LED light in such a manner that it maintains the LED light varying with surrounding environments and time uniform. The light correction unit 15 and the light driving unit 14 may be implemented in the form of a single-chip using a field programmable gate array (FPGA) or application specific integrated chip (ASIC).

In the current embodiment of the invention, xyz reference values or xyx values corresponding to the measured color coordinate values represent x, y, and z coordinate values on the chromaticity diagram, and the RGB value represents R, G, and B values. In addition, xyz reference values used when the lighting device is driven may be referred to as "reference color coordinate values".

A light correcting method according to an exemplary embodiment of the present invention will now be explained on the basis of the above-described lighting device 10.

Figure 4:
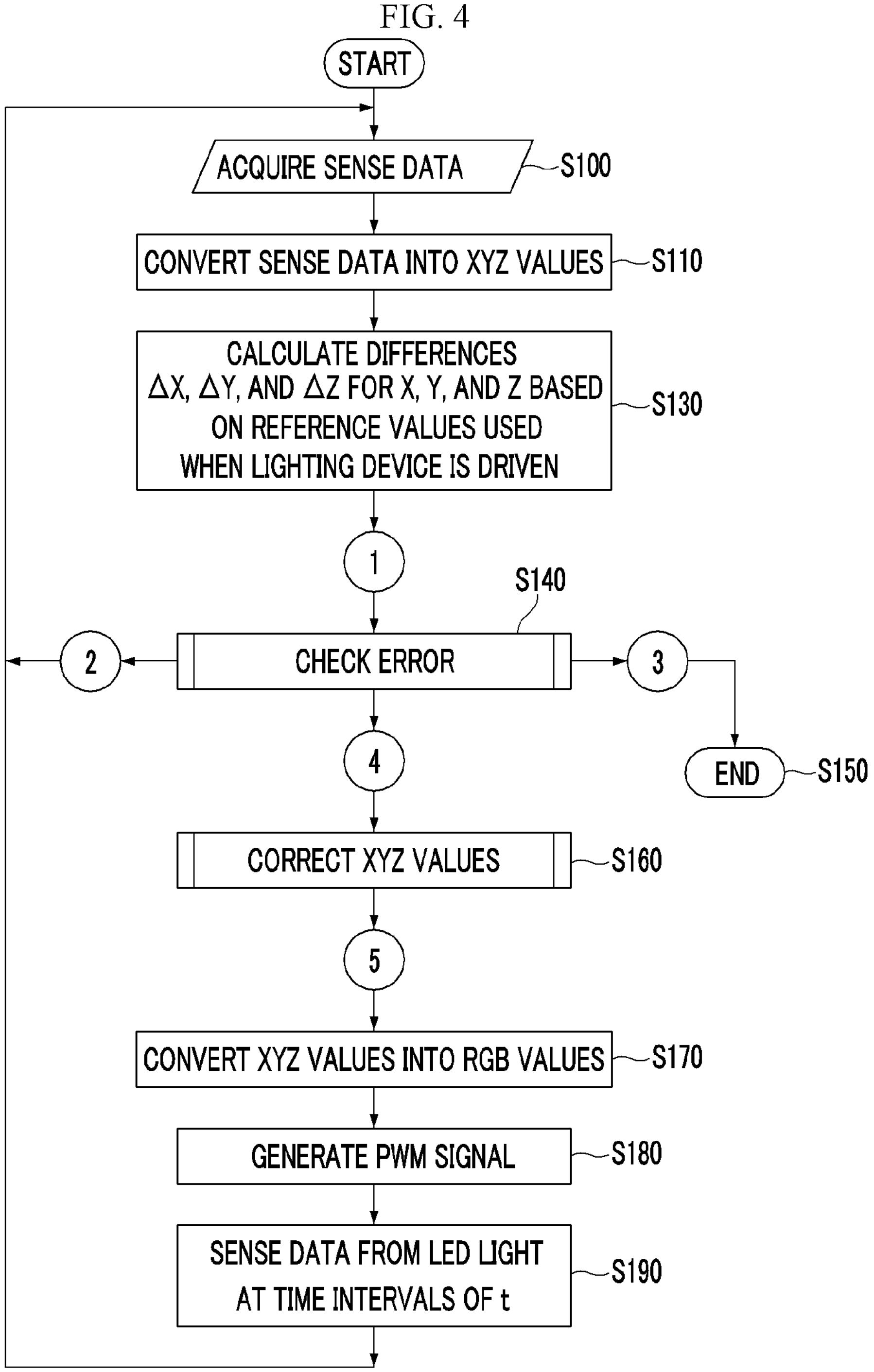
FIG. 4 is a flowchart illustrating a light correcting method according to an exemplary embodiment of the present invention.

FIG. 4 is a flowchart illustrating a correcting method in the lighting device 10 according to an exemplary embodiment of the invention.

Initial reference values for driving the lighting device 10 with a predetermined color temperature and color are set and stored in the reference value storage unit 12. This initial reference values may be arbitrarily designated by a user through an input interface (not shown) or set in advance when the lighting device is manufactured.

The power supply unit 11 of the lighting device 10 transforms an input AC power into a DC voltage for driving the LEDs of the lighting device 10 and provides the DC voltage to each constituent element. The light driving unit 14 drives the lighting unit 13 according to the DC voltage supplied from the power supply unit 11. Here, the light driving unit 14 drives the lighting unit 13 depending on the initial reference values stored in the reference value storage unit 12. That is, the light driving unit 14 converts XYZ reference values corresponding to the initial reference values into an RGB value, generates a PWM signal corresponding to the RGB value and outputs the PWM signal to the lighting unit 13 to drive the LED light.

Accordingly, as shown in FIG. 4, the sensing unit 16 senses light emitted from the lighting unit 13 when the lighting unit 13 is driven, and outputs RGB data that is sensing data corresponding to the sensed light. That is, the sensing unit 16 senses light emitted from the lighting unit 13 for a predetermined time after the LEDs of the lighting unit 13 start to be driven and outputs RGB data corresponding to the sensed light (S100).

The RGB data acquired when the lighting unit 13 is driven is transmitted to the light correction unit 15. The light correction unit 15 converts the RGB data into xyz values corresponding to a reference value form (S110). Differences between the xyz values and the XYZ reference values corresponding to the initial reference values used when the driving unit is driven are generated. Specifically, the differences between the xyz values and the XYZ reference values corresponding to the initial reference values are calculated for x, y, and z to acquire differences $\Delta X$, $\Delta Y$ and $\Delta Z$ (S130).

The light correction unit 15 checks whether there is an error on the basis of the differences $\Delta X$, $\Delta Y$, and $\Delta Z$ (S140).

Figure 5:
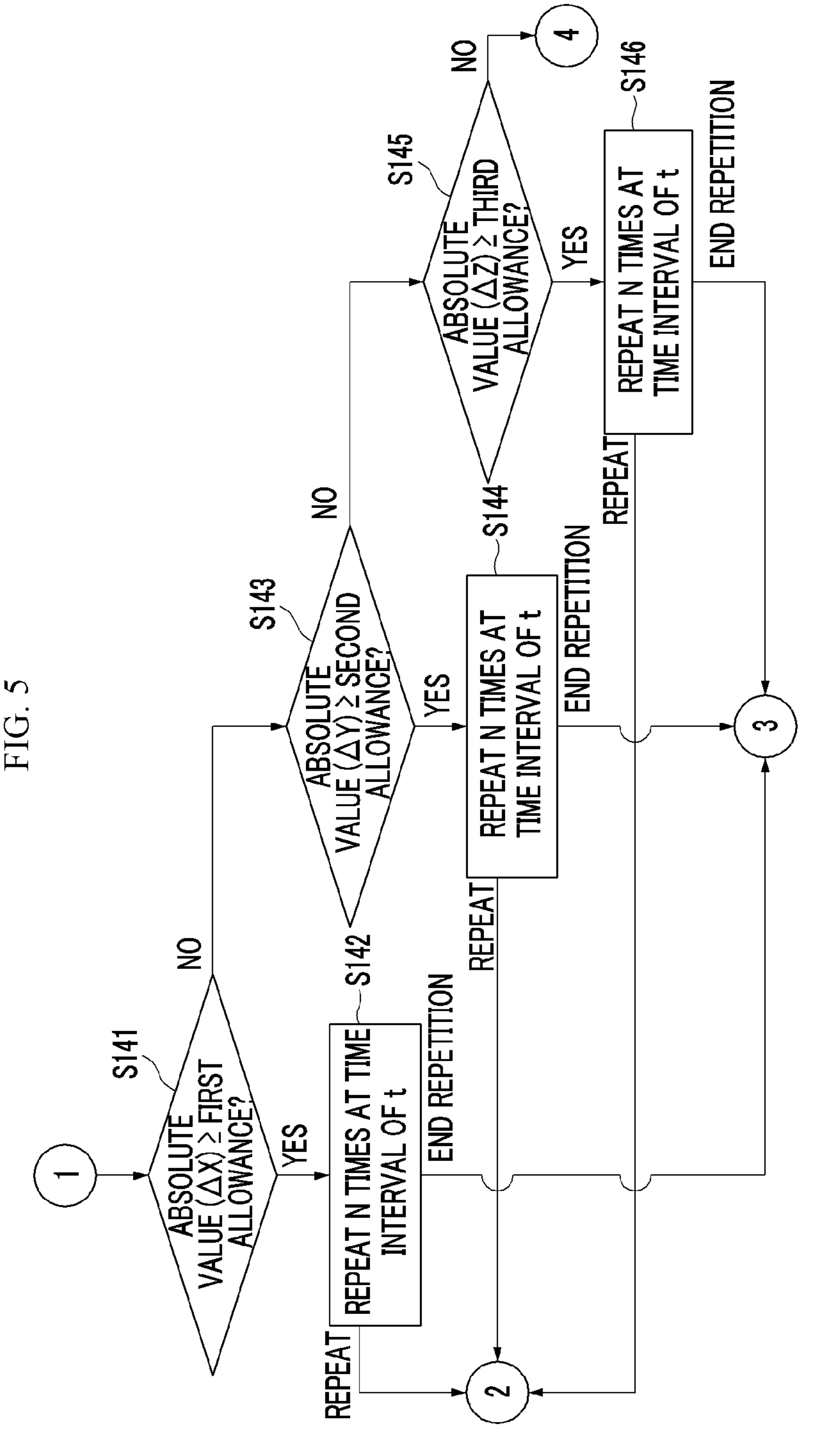
FIG. 5 is a flowchart illustrating an error checking process in the light correcting method according to an exemplary embodiment of the present invention.

FIG. 5 is a flowchart illustrating an error checking process in the correcting method according to an exemplary embodiment of the present invention.

In general, a light is varied little by little in a narrow range, and thus the differences $\Delta X$, $\Delta Y$, and $\Delta Z$ may be largely changed if strong stimulation (a light from another lighting device, sunlight, defective LEDs, etc.) is generated. When this phenomenon occurs, a difference larger than a predetermined allowance $\Delta$ may be generated for each of $\Delta X$, $\Delta Y$, and $\Delta Z$. In this case, it is preferable to delay a correction operation until the phenomenon disappears and then perform the correction operation after a predetermined lapse of time. To achieve this, error checking is performed on the basis of the differences $\Delta X$, $\Delta Y$, and $\Delta Z$ corresponding to the sensing data measured when the lighting device is driven in the current embodiment of the invention.

As shown in FIG. 5, the light correction unit 15 respectively compares the differences $\Delta X$, $\Delta Y$, and $\Delta Z$ corresponding to the sensing data with predetermined allowances. Specifically, the light correction unit 15 compares the first difference $\Delta X$ with a predetermined first allowance (S141) and, when $\Delta X$ is greater than the first allowance, performs a delay process that repeats the operations S100 to S140 for acquiring the sensing data when the lighting device is driven a predetermined number of times in order to delay the correction operation (S142). The operations (S100 to S140) for sensing light from the lighting unit and calculating the differences corresponding to the sensing data are collectively referred to as a "sensing process" for convenience of explanation.

The delay process performs the sensing process n times at a time interval of t, for example. The delay process is performed when $\Delta X$ exceeds the first allowance.

On the contrary, when the first difference ΔX is smaller than the first allowance, it is determined whether or not the second difference ΔY is greater than a second allowance (S143). When the second difference ΔY is greater than the second allowance, the delay process is performed (S144).

When the second difference ΔY is smaller than the second allowance, it is determined whether or not the third difference ΔZ is greater than a third allowance (S145). When the third difference ΔZ is greater than the third allowance, the delay process is performed (S146).

As described above, if any of ΔX, ΔY, and ΔZ exceeds the corresponding allowance when the ΔX, ΔY, and ΔZ are compared with the corresponding allowances (the first, second, and third allowances), it is determined that an error is generated due to external stimulation (light from another lighting device, sunlight, defective LEDs, etc.), and the correction operation is delayed. Here, the first, second, and third allowances may be different values or the same value.

If any of the differences ΔX, ΔY, and ΔZ corresponding to sensing data measured after a delay process exceeds the corresponding allowance, it is determined that an error is generated and the correction process is finished without performing a correction operation any more (S150).

When all the differences ΔX, ΔY, and ΔZ corresponding to the sensing data measured after the delay process is performed are smaller than the corresponding allowances, the correction process is carried out (S160).

Figure 6:
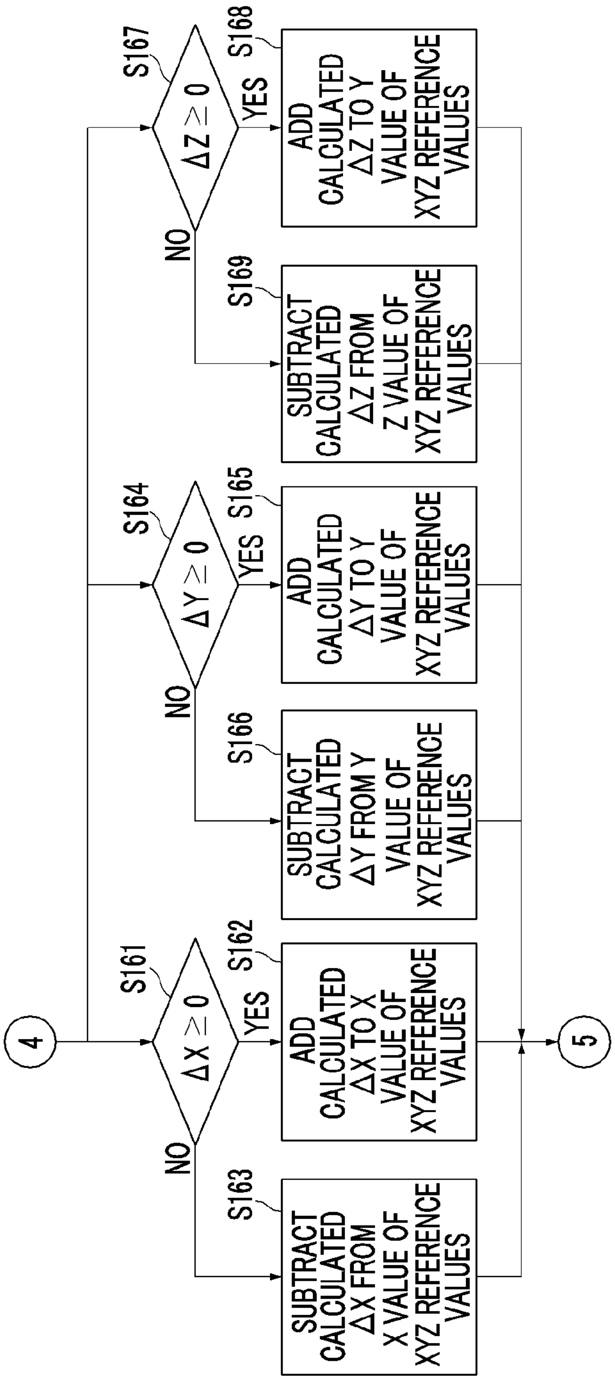
FIG. 6 is a flowchart illustrating a correction process in the light correcting method according to an exemplary embodiment of the present invention.
Figure 7:
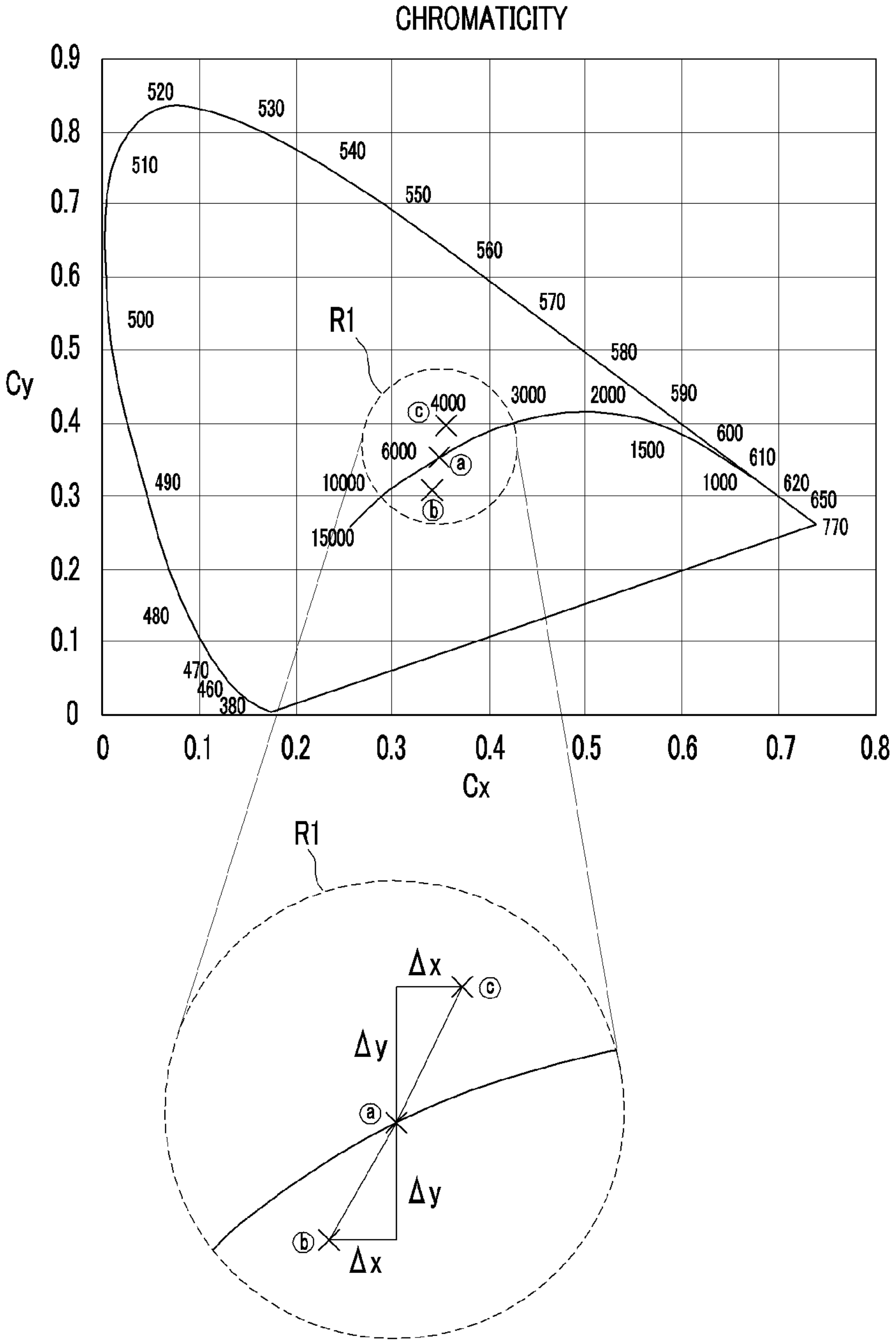
FIG. 7 shows chromaticity data on a chromaticity diagram, measured when a lighting device is driven.

FIG. 6 is a flowchart illustrating the correction process in the correcting method according to an exemplary embodiment of the present invention, and FIG. 7 shows sensing data on a chromaticity diagram, measured when the lighting device is driven.

As shown in FIG. 6, correction is respectively performed for x, y, and z on the basis of the differences ΔX, ΔY, and ΔZ corresponding to the sensing data in the current embodiment of the invention.

Before explanation of the correction, it is assumed that the lighting unit 13 is located in an initial position ⓐ of the chromaticity diagram, as shown in FIG. 7, when the lighting unit 13 is driven with the initial xyz reference values. In this case, the color temperature and color of the lighting unit 13 may vary with time due to the surrounding environment. It is assumed that the color temperature and color are changed within a variation range R1, for example, as shown in FIG. 7.

Among the differences ΔX, ΔY, and ΔZ corresponding to the sensing data, if the first difference ΔX is greater than "0" (S161), a correction is performed in such a manner that ΔX is added to the X value constituting the XYZ reference values used when the lighting unit 13 is driven (S162). Specifically, when ΔX is greater than "0", that is, when the sensing data is located in a first position ⓑ in the variation range R1 of FIG. 7, ΔX is added to the X value of the XYZ reference values used when the lighting unit 13 is driven. When ΔX is smaller than "0", that is, when the sensing data is located in a second position ⓒ, the value ΔX is subtracted from the X value of the XYZ reference values used when the lighting unit 13 is driven (S163).

In addition, correction is carried out for the second difference ΔY and, when ΔY is greater than "0", that is, when the sensing data is located in the first position ⓑ in the variation range R1, ΔY is added to the Y value of the XYZ reference values used when the lighting unit 13 is driven (S164 and S165). When ΔY is smaller than "0", that is, when the sensing data is located in the second position ⓒ, ΔY is subtracted from the Y value of the XYZ reference values used when the lighting unit 13 is driven (S166).

Furthermore, correction is carried out for the third difference ΔZ and, when ΔZ is greater than "0", ΔZ is added to the Z value of the XYZ reference values used when the lighting unit 13 is driven (S167 and S168). When ΔZ is smaller than "0", ΔZ is subtracted from the Z value of the XYZ reference values used when the lighting unit 13 is driven (S169).

Upon completion of correction for the XYZ reference values used when the lighting device is driven, the lighting unit 13 is driven again based on the corrected xyz reference values, as shown in FIG. 5. That is, the light driving unit 14 converts the corrected XYZ reference values into an RGB value (S170) and generates a PWM signal depending on the RGB value to drive the lighting unit 13 (S180).

Accordingly, when the color temperature or color of light is changed according to the surrounding environment variation with time, it is possible to obtain uniform light by correcting the value for driving the lighting unit, as described above.

The aforementioned correcting method can be periodically performed at predetermined time intervals.

According to the above-described embodiments of the present invention, light emitted from an LED light can be sensed using an RGB sensor, and a deviation of a light characteristic from an initially set reference value can be automatically sensed and corrected using color coordinates for various LED lights including white light. Accordingly, a light variation according to a surrounding environment and time can be minimized so as to provide unvarying uniform light.

According to exemplary embodiments of the present invention, it is possible to automatically correct a variation in a LED light according to surrounding environments or time on the basis of reference values of the LED light, which are initially set when the LED light is manufactured, regardless of LED types, such as a white LED (warm white LED and cool white LED), red LED, green LED and blue LED, to thereby maintain unvarying light quality.

The exemplary embodiments of the present invention are not implemented only by the above-mentioned apparatus and/or method and can be implemented through a program for executing functions corresponding to configurations the embodiments of the present invention and a medium recording the program, and this implementation can be easily carried out by those skilled in the art from descriptions of the above embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for correcting a lighting device, comprising:

sensing light emitted from the lighting device when the lighting device is driven and generating sensing data including RGB values corresponding to the sensed light;

converting the sensing data into measured color coordinate values corresponding to color coordinates;

calculating differences between the measured color coordinate values corresponding to the sensing data and reference color coordinate values used when the lighting device is driven; and correcting the reference color coordinate values on the basis of the calculated differences; and comparing the differences with predetermined allowances to determine whether or not to perform correction, and performing a delay process for delaying the correction when it is determined that the correction is not to be performed, wherein the color coordinate values are composed of x, y, and z, and the differences include a first difference corresponding to a difference between an x value of the measured color coordinate values corresponding to the sensing data and an x value of the reference color coordinate values, a second difference corresponding to a difference between a y value of the measured color coordinate values corresponding to the sensing data and a y value of the reference color coordinate values, and a third difference corresponding to a difference between a z value of the measured color coordinate values corresponding to the sensing data and a z value of the reference color coordinate values.

2. The method of claim 1, wherein the determining of whether or not to perform correction comprises:

respectively comparing the first, second, and third differences with first, second, and third allowances; and determining that correction is not to be performed if any of the first, second, and third differences exceed the corresponding allowance.

3. The method of claim 2, wherein the determining of whether or not to perform correction further comprises performing correction when all of the first, second, and third differences do not exceed the corresponding allowances.

4. The method of claim 2, wherein the first, second, and third allowances have the same value.

5. The method of claim 2, wherein the performing of the delay process repeats a process of acquiring the sensing data for a predetermined period, and includes calculating the differences and comparing the differences with the corresponding allowances a predetermined number of times.

6. The method of claim 5, wherein the performing of the delay process finishes a correction operation if any of the first, second, and third differences exceed the corresponding allowance even though the process has been repeated the predetermined number of times for the predetermined period.

7. The method of claim 2, wherein the correcting of the reference color coordinate values comprises:

adding or subtracting the first difference to or from the x value of the reference color coordinate values;

adding or subtracting the second difference to or from the y value of the reference color coordinate values; and adding or subtracting the third difference to or from the z value of the reference color coordinate values.

8. The method of claim 7, wherein when the first, second, and third differences are greater than "0", a correction operation of adding the differences is performed, and when the first, second, and third differences are smaller than "0", a correction operation of subtracting the differences is performed.

9. An apparatus for correcting a lighting device, comprising:

a sensing unit that senses light emitted from the lighting device when the lighting device is driven and generating sensing data including RGB values corresponding to the sensed light; and a correction unit that corrects reference color coordinate values corresponding to color coordinates used when the lighting device is driven using the sensing data, wherein the correction unit comprises:

a conversion module that converts the sensing data into measured color coordinate values corresponding to color coordinates;

a calculation module that calculates differences between the measured color coordinate values corresponding to the sensing data and the reference color coordinate values used when the lighting device is driven; and a correction module that corrects the reference color coordinate values on the basis of the calculated differences, wherein the color coordinate values are composed of x, y, and z, and the differences include a first difference corresponding to a difference between an x value of the measured color coordinate values corresponding to the sensing data and an x value of the reference color coordinate values, a second difference corresponding to a difference between a y value of the measured color coordinate values corresponding to the sensing data and a y value of the reference color coordinate values, and a third difference corresponding to a difference between a z value of the measured color coordinate values corresponding to the sensing data and a z value of the reference color coordinate values.

10. The apparatus of claim 9, wherein the correction module performs a process for comparing the differences with predetermined allowances, determining whether or not to perform correction, and performing a delay process for delaying the correction when determining that the correction is not to be performed.

11. The apparatus of claim 9, wherein the delay process repeats a process of acquiring the sensing data for a predetermined period, calculating the differences, and comparing the differences with corresponding allowances a predetermined number of times.

12. The apparatus of claim 9, wherein the correction module respectively compares the first, second, and third differences with first, second, and third allowances, and determines that correction is not to be performed when any of the first, second, and third differences exceeds the corresponding allowance.

13. The apparatus of claim 9, wherein the correction module performs one of a correction operation of adding the first difference to the x value of the reference color coordinate values, a correction operation of adding the second difference to the y value of the reference color coordinate values, and a correction operation of adding the third difference to the z value of the reference color coordinate values when one of the first, second, and third differences exceeds "0", and carries out one of a correction operation of subtracting the first difference from the x value of the reference color coordinate values, a correction operation of subtracting the second difference from the y value of the reference color coordinate values, and a correction operation of subtracting the third difference from the z value of the reference color coordinate values when one of the first, second, and third differences is smaller than "0".

14. The apparatus of claim 9, wherein the sensing unit is located between the lighting device and a diffuser and is configured with a sensor that outputs RGB values including an R value, a G value, and a B value that respectively correspond to an R component, a G component, and a B component of the light emitted from the lighting device.

15. The apparatus of claim 9, wherein the lighting device includes a white light emitting diode (LED) and red, green, blue (RGB) LEDs.

* * * * *